B. MELTZER.
AUTOMATIC VEHICLE BRAKE.
APPLICATION FILED JAN. 29, 1921.

1,410,947.

Patented Mar. 28, 1922.

Inventor
Benjamin Meltzer

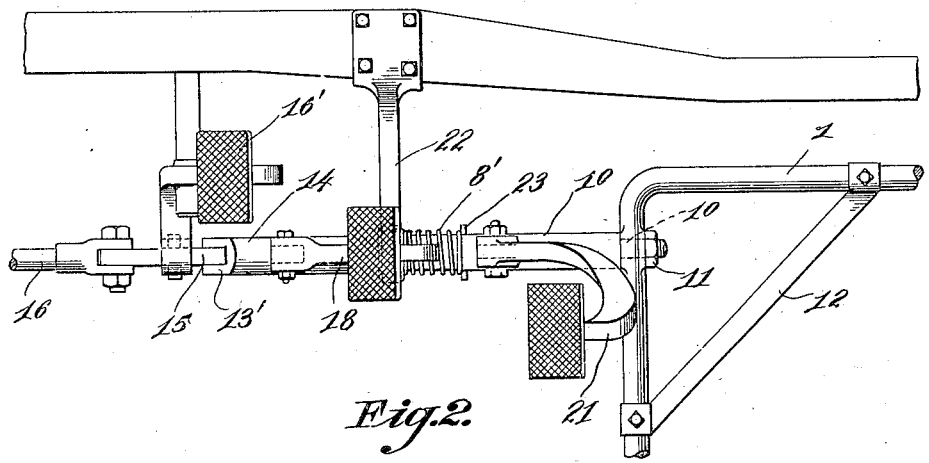
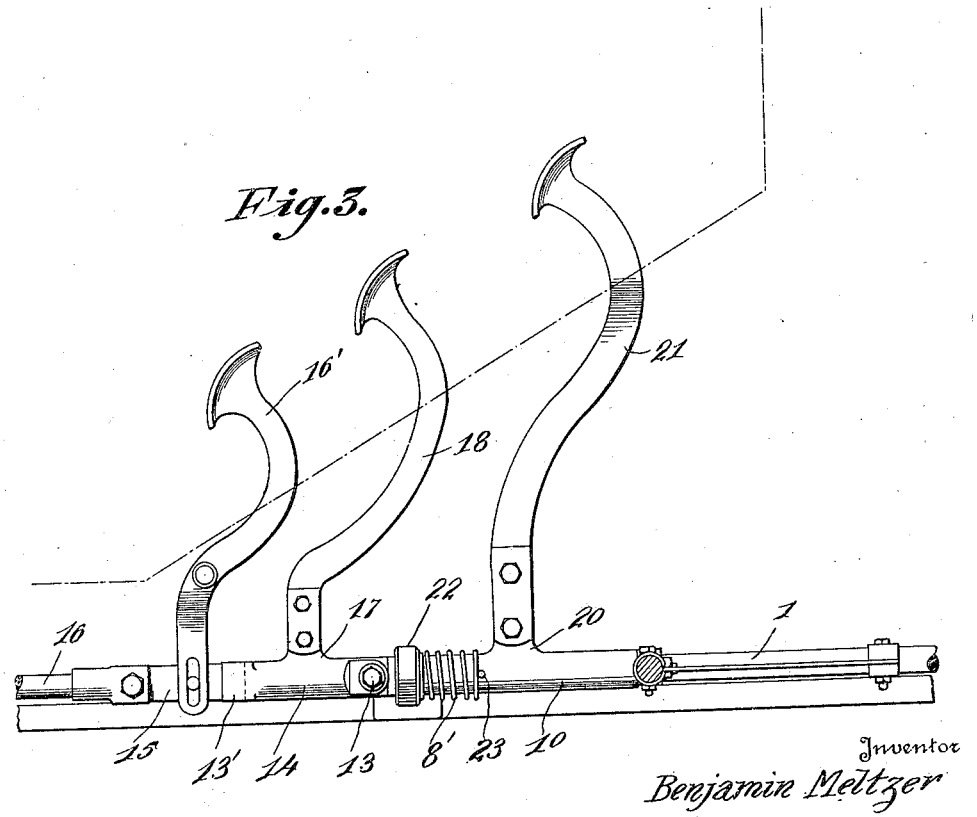

UNITED STATES PATENT OFFICE.

BENJAMIN MELTZER, OF BROOKLYN, NEW YORK.

AUTOMATIC VEHICLE BRAKE.

1,410,947.   Specification of Letters Patent.   Patented Mar. 28, 1922.

Application filed January 29, 1921. Serial No. 440,909.

*To all whom it may concern:*

Be it known that I, BENJAMIN MELTZER, a citizen of the United States, residing at Brooklyn, in the county of Kings and State of New York, have invented new and useful Improvements in Automatic Vehicle Brakes, of which the following is a specification.

This invention relates to a device for automatically applying the brakes of a vehicle when the vehicle strikes an object, and, more specifically, to the type in which a fender positioned at the front of the vehicle is connected to the brake so as to operate the brake under the conditions above mentioned.

An object of the invention is to provide a device of this character in which the fender may be readily disconnected from the brake mechanism, preferably from the driver's seat.

Another object of the invention is to provide a connection between the fender and the brake mechanism which is of extremely simple and rugged construction, adapted to withstand the strains and jars incident to the automatic application of the brake when a collision takes place.

A still further object of the invention is to provide means whereby the brake may be readily released and the fender returned to normal position by the operator of the vehicle, and also a device which may be quickly applied to the ordinary motor vehicle without altering the structure of the vehicle or its brake mechanism in any way.

The above and other objects of a more minute character will become obvious from a reading of the following description in connection with the accompanying drawings, wherein there is shown and described one form of a device in which my invention may be embodied, it being understood that the showing is merely illustrative, and that such changes may be made therein as come within the scope of the invention as defined in the appended claims.

In the drawings:

Fig. 2 is a plan view showing a portion of my mechanism on a slightly enlarged scale, and Fig. 3 is a side elevational view of that portion of the mechanism shown in Fig. 2.

Figure 1:
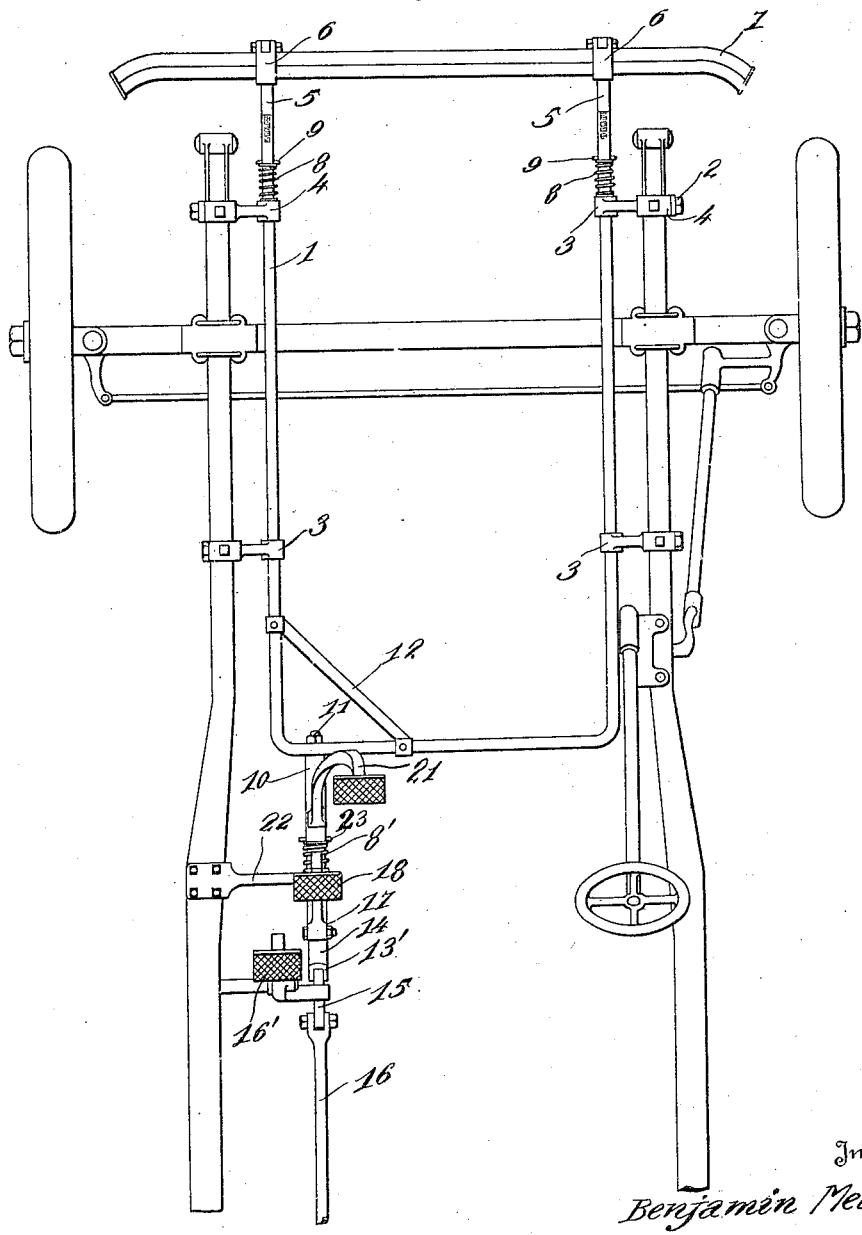
Fig. 1 is a plan view of a portion of a vehicle chassis showing my invention applied to the vehicle.

Referring to the drawings more in detail, 1 indicates a yoke having its arms slidably mounted in bearings 3 formed in brackets 4, which may be secured by bolts 2 to the frame of the vehicle. At the forward end of each arm of the yoke are removably positioned pins 5, which are threaded into the ends of the yoke and are formed with clamps 6 which engage a fender 7 extending transversely of the vehicle. In order to hold the yoke in normal position, springs 8 may be placed upon each arm so as to abut at one end the bearings 3 and at the other end lugs 9 formed upon the arms. It will be evident that any rearward movement of the yoke in its bearings will compress the springs which will thus tend to return the fender and the yoke to forward position. At its closed end, the yoke has connected thereto a shaft 10 which is formed with a reduced threaded portion 10' extending through the yoke and having a nut 11 thereon to hold it in position. This shaft extends rearwardly, and, it will be noted, is connected to the yoke immediately adjacent a strengthening rod 12 secured to the yoke adjacent one corner to reenforce the yoke against the strains which arise when the brake mechanism is operated through the fender.

By reference to Figs. 2 and 3, it will be observed that the shaft 10 has pivotally connected to its rear end a link 14, one forked end of which fits over a lug at the rear end of the shaft 10. A bolt 13 passes through the forks of the link and the lug of the shaft to pivotally connect the link and the shaft together. The rear end 13' of the link is similarly forked, or provided with a recess in order to engage an extension 15 upon the brake rod 16, and having a brake pedal 16', the brake rod extending rearwardly, and operating a common form of brake mechanism indicated in Fig. 1. Upon the upper face of the link 14 is formed a lug 17 to which is fixedly connected a pedal 18 which may be used to swing the link upwardly when it is desired to disconnect the fender from the brake mechanism. The normal position of the link is indicated in Fig. 3, the same being shown in this figure as being in substantial alignment with the shaft 10.

By reference to the several views, it will also be noted that the shaft 10 is formed at substantially a central point with an upwardly extending lug 20 to which may be fixedly connected a foot pedal 21 for the purpose of returning the fender to normal position after the brake has been thrown into operation. This pedal may be rigidly connected to the shaft so that forward movement of the same will move the shaft 10 in the same direction, thus assisting the return compression springs 8 upon the yoke, and also a similar spring 8' located upon the shaft 10 abutting a frame extension 22 surrounding the shaft and a set pin 23 extending through the shaft.

It is thought that the operation of this device will be clear from the above detailed description of its construction, but it might be remarked that the parts will normally be in the position shown in Figures 1, 2 and 3. When a collision takes place the fender with the yoke 1 will be moved rearwardly, bringing the free forked end of the link 14 into engagement with the brake rod extension 15, whereupon the brakes will be applied. During the application of the brakes, the springs 8, 8' will be compressed and will, therefore, have a tendency to take up some of the shock incident to the application of the brakes through the collision, and will also tend to return the fender to normal position. Should the spring power be insufficient for this purpose due to a binding at any of the several joints, the pedal 21 may be pressed by the operator to return the mechanism to normal position. When the operator wishes to place the mechanism in inoperative position and disconnect the fender from the brake mechanism, it is merely necessary to press the pedal 18 whereby the link 14 will be raised and any subsequent movement of the fender in the yoke will not affect the brakes. In this relation of the parts, the fender return springs 8, 8' will take up the jar of any collision but the movement of the fender will not apply the brakes. It should be noted that due to the type of connection between the link 14 and the brake rod, which connection is in the form of a mere abutment of the link and the brake rod extension 15, the brake mechanism may be operated by the driver of the vehicle at any time without moving the fender, it being possible to move the brake rod independently of the shaft 10 or the link 12.

I claim:

1. The combination with a vehicle including a brake mechanism and means for applying the brake mechanism comprising a brake rod, of a fender movably mounted upon the vehicle, operating connections between said fender and said brake mechanism whereby the brake may be applied upon movement of the fender, said connections permitting operation of the brake mechanism without moving said fender and comprising a shaft connected to said fender and reciprocably movable with the fender, means on said shaft abutting the means for applying the brake mechanism, and adapted to actuate the brake applying mechnism upon movement of the fender due to the mere abutting engagement, and means operable for moving said means on the shaft abutting the brake mechanism to thereby disassociate the shaft and the brake mechanism.

2. The combination with a vehicle including a brake mechanism and means for applying the brake mechanism comprising a brake rod, of a fender movably mounted upon the vehicle, operating connections between said fender and said brake mechanism adapted to cause application of the brake mechanism upon movement of the fender, said connections comprising a shaft connected to the fender and having a reciprocable movement with the fender, movable means upon said shaft abutting the brake rod and adapted to move the brake rod to apply the brake mechanism due to the mere abutting engagement, said means being reciprocable with the shaft and fender and permitting operation of the brake mechanism without moving the fender, and means operable from the driver's seat to move said means out of abutment with said brake rod.

3. The combination with a vehicle including a brake mechanism and a brake-rod, of a fender movably mounted upon the vehicle, operating connections between said fender and said brake mechanism whereby the brakes may be applied upon movement of the fender, said connections comprising a shaft connected to said fender and slidably mounted upon the vehicle, a pivoted link on said shaft releasably engaging the brake-rod, said link permitting operation of the brake mechanism without moving the fender, and a member operable from the driver's seat for swinging said link to disconnect said shaft from the brake-rod.

4. The combination with a vehicle including a brake mechanism and a brake-rod, of a fender movably mounted upon the vehicle, operating connections between said fender and said brake mechanism whereby the brakes may be applied upon movement of the fender, said connections comprising a shaft connected to said fender and slidably mounted upon the vehicle, a pivoted link on said shaft releasably engaging the brake-rod, said link permitting operation of the brake mechanism without moving the fender, a member operable from the driver's seat for swinging said link to disconnect said shaft from the brake-rod, and means operable from the driver's seat for moving the fender to normal position after it has been repressed to actuate the brake mechanism.

In testimony whereof I have hereunto set my hand.

BENJAMIN MELTZER.